(12) United States Patent
Ziegler

(10) Patent No.: US 7,932,682 B2
(45) Date of Patent: Apr. 26, 2011

(54) INTERNAL POWER SUPPLY FOR A BALLAST

(75) Inventor: Markus Ziegler, Via Latina (MX)

(73) Assignee: Osram Sylvania, Inc., Danvers, MA (US)

( * ) Notice: Subject to any disclaimer, the term of this patent is extended or adjusted under 35 U.S.C. 154(b) by 442 days.

(21) Appl. No.: 12/165,191

(22) Filed: Jun. 30, 2008

(65) Prior Publication Data

US 2009/0322238 A1 Dec. 31, 2009

(51) Int. Cl.
*H05B 37/02* (2006.01)
(52) U.S. Cl. ......... 315/307; 315/226; 315/247; 315/287
(58) Field of Classification Search ............... 315/209 R, 315/224–226, 244, 247, 287, 291, 294, 297, 315/307
See application file for complete search history.

(56) References Cited

U.S. PATENT DOCUMENTS

| 5,572,094 | A | * | 11/1996 | Yamashita et al. | 315/308 |
| 5,604,411 | A | * | 2/1997 | Venkitasubrahmanian et al. | 315/307 |
| 5,751,115 | A | * | 5/1998 | Jayaraman et al. | 315/225 |
| 6,057,652 | A | * | 5/2000 | Chen et al. | 315/307 |
| 6,111,368 | A | | 8/2000 | Luchaco | |
| 6,717,370 | B2 | * | 4/2004 | Van Der Veen | 315/224 |
| 7,061,191 | B2 | * | 6/2006 | Chitta | 315/307 |
| 2003/0198066 | A1 | | 10/2003 | Kasai et al. | |
| 2004/0119425 | A1 | * | 6/2004 | Okamoto et al. | 315/291 |
| 2004/0183472 | A1 | * | 9/2004 | Kamoi et al. | 315/291 |
| 2005/0012472 | A1 | * | 1/2005 | Soehnel | 315/291 |

FOREIGN PATENT DOCUMENTS

| EP | 0 651 310 A2 | 5/1995 |
| EP | 1 833 155 A2 | 9/2007 |
| WO | 197 48 007 A1 | 5/1999 |
| WO | 2004/059824 A1 | 7/2004 |
| WO | 2009/121529 A1 | 10/2009 |

OTHER PUBLICATIONS

Notification of Transmittal of The International Search Report and the Written Opinion of the International Searching Authority in International Application No. PCT/US2009/048092, dated Dec. 9, 2010.

* cited by examiner

*Primary Examiner* — Douglas W Owens
*Assistant Examiner* — Tung X Le
(74) *Attorney, Agent, or Firm* — Senniger Powers LLP

(57) ABSTRACT

A ballast used with an input power source for energizing a lamp. The ballast includes a power stage, a controller, an internal power supply for the power stage and the controller, and an input switch. The power stage energizes the lamp with power supplied by the input power source. The internal power supply is connected to the power stage for receiving power from the power stage and is connected to the input power source via the input switch for receiving power from the input power supply when the input switch operates in a closed mode. When the input switch operates in an open mode it electrically disconnects the internal power supply from the input power source. The controller selectively operates the input switch in the open mode and the closed mode as a function of the voltage of the internal power supply while the lamp is energized.

20 Claims, 2 Drawing Sheets

INTERNAL POWER SUPPLY FOR A BALLAST

BACKGROUND

A ballast provides power to a lamp and regulates the current and/or power provided to the lamp. Lamps, such as High Intensity Discharge (HID) lamps and fluorescent lamps require a ballast to provide the proper starting voltage for the lamp and to limit the operating current once the lamp is ignited. A ballast generally includes a power factor control (PFC) circuitry for sinusoidal input current control and generation of a regulated direct current (DC) bus voltage. Additionally, the ballast includes a lamp driver for providing a constant power to the lamp while the lamp is energized and compensating for fluctuations and fault conditions of the line voltage. While the lamp driver is providing current to the lamp, the lamp driver may also be configured to provide power for energizing the components of the ballast. The ballast may include a controller, such as a microcontroller for precisely controlling the PFC circuitry and the lamp driver. The controller may be further configured to perform features such as dimming, lamp fault detection, and end-of-life lamp monitoring.

The PFC circuitry, lamp driver, and controller must be energized before they can begin performing the functions discussed above. Conventional ballasts have used external power supply integrated chips in order to energize the components of the ballast while the ballast is starting up. However, such integrated chips add to the number of ballast components and increase the overall cost of the ballast. Currently known internal power supplies unnecessarily continue to dissipate power, after the ballast has finished starting up, while the lamp driver is providing power sufficient for energizing the ballast components.

SUMMARY

Embodiments of the present invention relate to a ballast used with an input power source for energizing a lamp. In particular, the ballast includes a power stage, a controller, an internal power supply for the power stage and the controller, and an input switch connected to the input power source via a resistor. The power stage energizes the lamp with power supplied by the input power source. The internal power supply is connected to the power stage for receiving power from the power stage and is connected to the input power source via the input switch and resistor for receiving power from the input power supply when the input switch operates in a closed mode. When the input switch operates in an open mode it electrically disconnects the internal power supply from the input power source. The controller operates the input switch in the open mode while the lamp is energized and the power stage is providing sufficient power to the internal power supply. Conversely, the controller operates the input switch in the closed mode while the lamp must be energized and the power stage is providing insufficient power to the internal power supply.

Accordingly, during normal ballast operation, embodiments of the present invention connect the internal power supply to the input power source only when the internal power supply needs additional power. The internal power supply and the input power source are otherwise disconnected so that power is not unnecessarily dissipated through the resistor. Thus, the present invention improves the energy efficiency of the ballast and reduces the operating temperature of the ballast.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Embodiments of the invention generally relate to a ballast for use with an input power source for energizing a lamp. The ballast includes an internal power supply for energizing a lamp driver and a controller. A trickle resistor is used to draw current from the input power source to the internal power supply while the ballast is operating in start up mode. When the ballast is operating in normal mode, the lamp driver provides power to the internal power supply. Embodiments of the invention include a switch, operated by the controller, for disconnecting the trickle resistor from the input power source while the ballast is operating in normal mode and the lamp driver is providing sufficient power to the internal power supply. Additionally, the switch may be operated by the controller for re-connecting the trickle resistor to the input source while the ballast is operating in normal mode and the lamp driver is not providing sufficient power to the internal power supply, or while the ballast is operating in power save mode. Thus, embodiments of the invention maximize the energy efficiency of the ballast by eliminating power from being unnecessarily dissipated by the trickle resistor.

Figure 1:
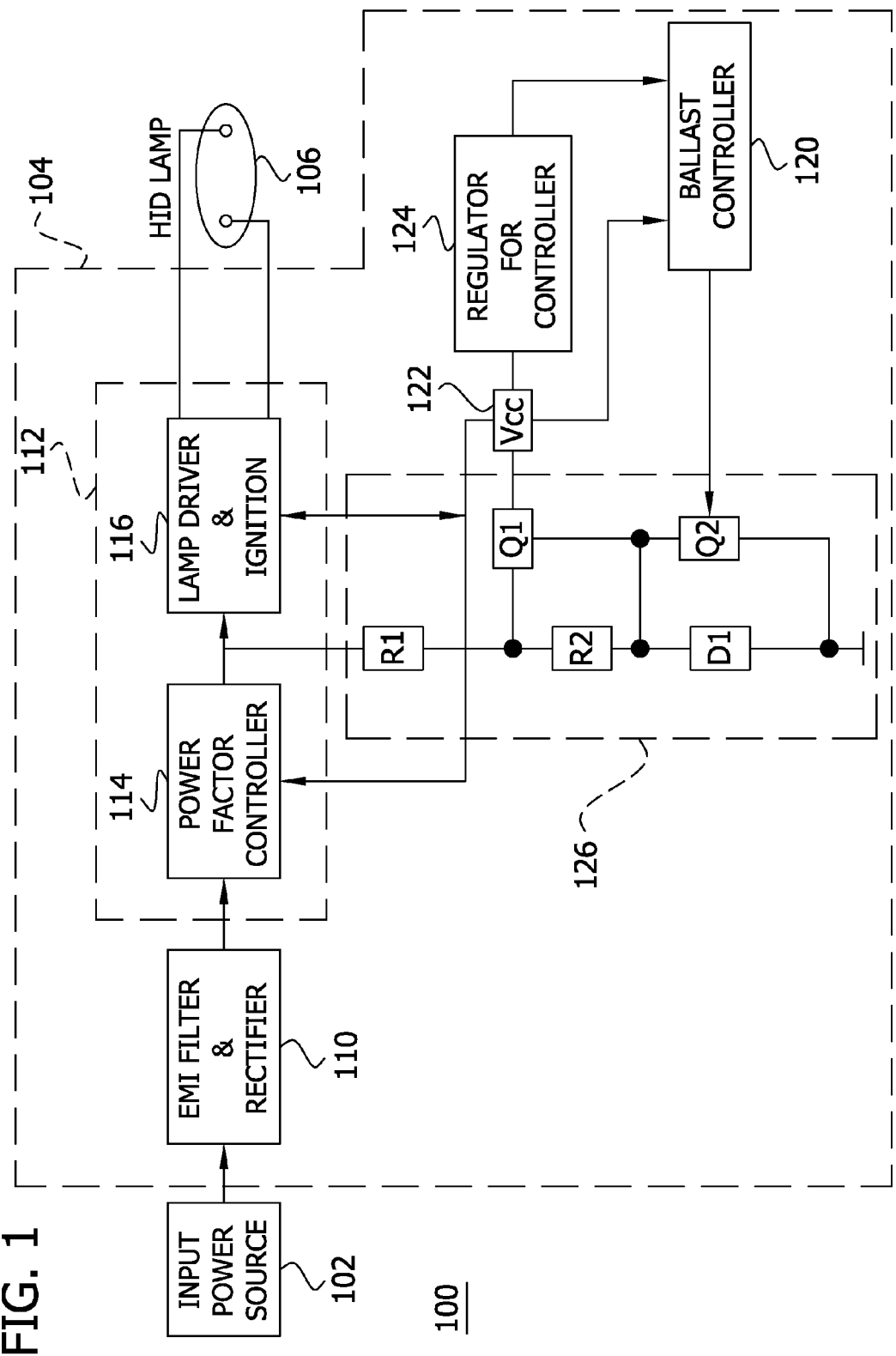
FIG. 1 is a block diagram of a lamp system having a ballast for use with an input power source to energize a High Intensity Discharge (HID) lamp according to one embodiment of the invention.

FIG. 1 illustrates a lamp system 100 according to an embodiment of the invention. The lamp system 100 includes an input power source 102, such as an alternating current (AC) power source, an electronic ballast 104, and a lamp 106. The lamp system 100 discussed herein is used for energizing one or more High Intensity Discharge (HID) lamps 106. Exemplary HID lamps include mercury vapor, metal halide, high-pressure sodium, and low-pressure sodium lamps. The lamp system 100 may be used for energizing other types of lamps, such as a fluorescent lamp, without departing from the scope of the invention.

The ballast 104 includes one or more input terminals adapted for connecting to the input power source 102 and a ground terminal connectable to ground potential. In one embodiment, the input power source 102 includes a first voltage source (e.g., 120 volts AC) and a second voltage source (e.g., 277 volts AC). The ballast 104 is operatively connected to either the first voltage source or the second voltage source. Thus, the ballast 104 may selectively receive power from either a standard commercial voltage source (i.e., 277 volts AC) or a normal residential voltage source (120 VRMS, 60 Hertz).

The ballast 104 receives an input AC power signal from the input power source 102 via the input terminal. In one embodiment, the ballast 104 includes an electromagnetic interference (EMI) filter and a rectifier (e.g., full-wave rectifier), illustrated together as 110. The EMI filter prevents noise which may be generated by the ballast 104 from being transmitted back to the input power source 102. The rectifier converts AC voltage of the input power signal to DC (direct current) voltage.

The ballast 104 includes a power stage 112 for converting power supplied by the input power source 102 to drive the lamp 106. In the illustrated embodiment, the ballast 104 includes a first power stage comprising a power factor control circuit 114. The power factor control circuit 114, such as a boost converter, receives the rectified input power signal and produces a high DC voltage (e.g., 460 volts DC).

In the illustrated embodiment, the ballast 104 also includes a second power stage comprising a lamp driver (broadly, lamp driver and ignition circuit) 112. For example, the second power stage may include an inverter circuit, such as a resonant converter, which converts the high DC voltage into a suitable AC voltage for energizing the lamp 106. In one example, the lamp driver 112 includes an output transformer (not shown), having a primary winding and a secondary winding, for delivering power the lamp 106. The output transformer may also include another secondary winding, for providing power to an internal power supply, as discussed below.

The ballast 104 may also include a capacitor (not shown), such as an electrolytic capacitor, connected in a shunt configuration between the first power stage 114 and the second power stage 116 to provide a low impedance source of voltage to the inverter.

The ballast 104 includes a controller 120, such as a microcontroller, for controlling the operations of the components of the ballast 104. In one embodiment, the controller 120 has a first output and a second output which each electrically connect the controller 120 to the lamp driver 116. In particular, the controller 120 provides a power signal to the lamp driver 116 via the first output to control the energizing (e.g., turning on or turning off) of the lamp driver 116. The controller 120 provides a control signal to the lamp driver 116 via the second output to control the output power that the lamp driver 116 delivers to the lamp 106. The controller 120 may similarly include a third output and a fourth output electrically connecting the controller 120 to the power factor control circuit 114 for respectively providing a power signal and a control signal to the power factor control circuit 114.

The ballast 104 includes an internal power supply 122 (i.e., controller power supply, microcontroller power supply, Vcc supply), such as a capacitor (e.g., low voltage storage capacitor), adapted for electrically connecting to the input power source 102 and connected to the lamp driver 116 (e.g., via the another second winding) for selectively receiving power therefrom as discussed below.

The internal power supply 122 is also electrically connected to the power factor control circuit 114, the lamp driver 116, and the controller 120 for providing the received power to each of these components for energizing the components 114, 116, 120. In the illustrated embodiment, the controller 120 has an input that electrically connects the controller 120 to the internal power supply 122. The ballast 104 includes a linear regulator 124 connected between the internal power supply 122 and the controller 120 input for providing a constant voltage (e.g., 5 volts) to the controller 120 for energizing the controller 120.

Figure 2:
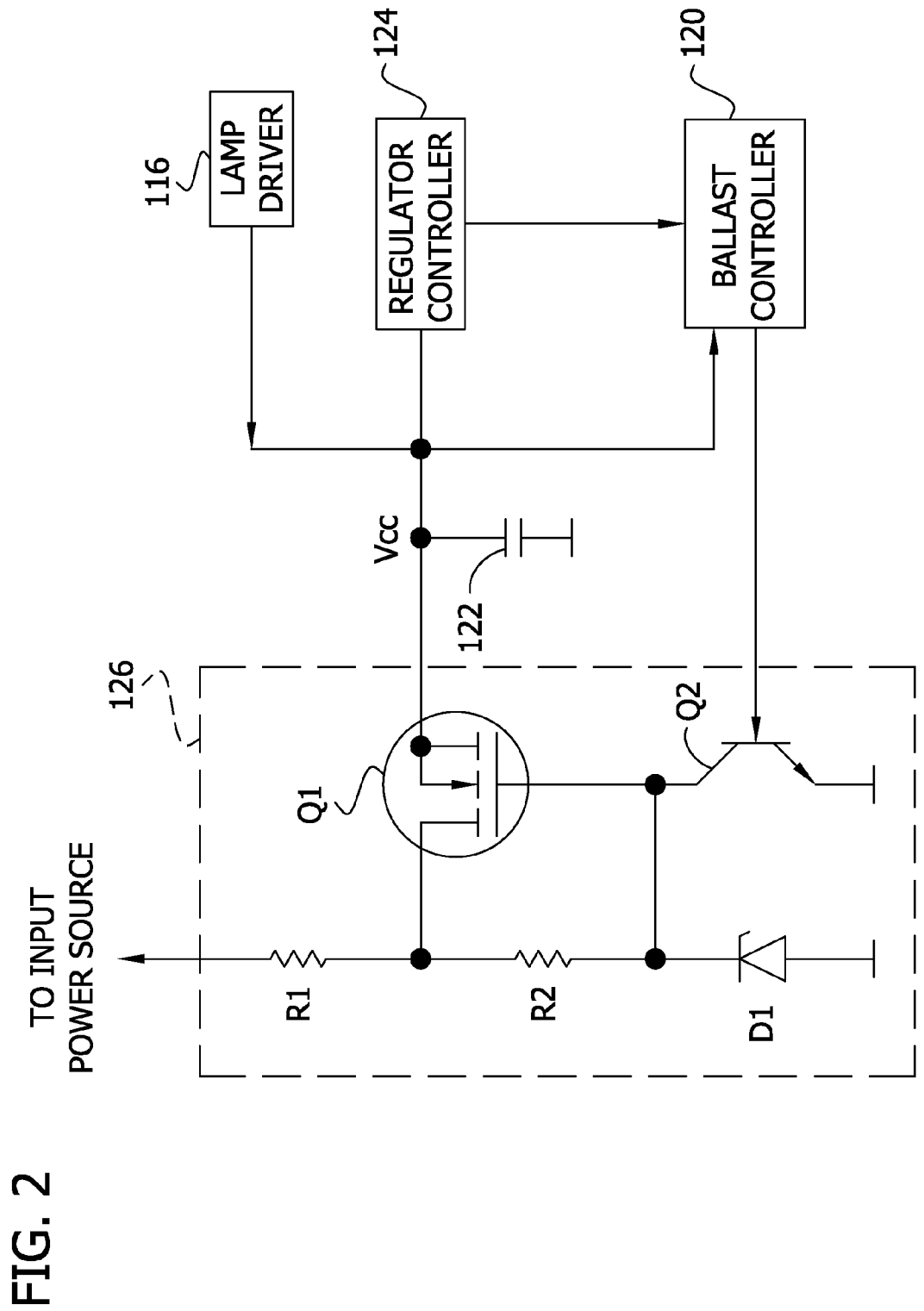
FIG. 2 is a schematic of an input circuit for a ballast according to one embodiment of the invention.

Referring to FIG. 2, the ballast 104 includes an input circuit 126 connected to the internal power supply 122 between the internal power supply 122 and the input power source 102. The input circuit 126 includes a resistor R1 (i.e., "trickle" resistor, eg., 10 kilo ohm resistor) adapted for electrically connecting to the input power source 102 to draw current from the input power source 102. The input circuit 126 includes a switch Q1 (broadly, switching component), such as a metal-oxide-semiconductor field-effect transistor (e.g., STD1NK60 n-channel MOSFET available from STMicroelectronics) electrically connected between the resistor R1 and the internal power supply 122. The switch Q1 has a closed mode and an open mode. In the closed mode, the switch Q1 electrically connects the internal power supply 122 to input power source 102 and conducts the power drawn by the resistor R1 from the input power source 102 to the internal power supply 122. In the open mode, the switch Q1 electrically disconnects the internal power supply 122 from the input power source 102 so that the resistor R1 does not draw power from the input power source 102. The controller 120 has an output by which the switch Q1 and the controller 120 are electrically connected so that the controller 120 can control the mode of the switch Q1 based on the criteria set forth below.

The ballast 104 and components thereof are configured for operating in three operating modes: (1) startup mode; (2) normal mode; and (3) power save mode. The ballast 104 initiates operation in the startup mode when the input power source 102 begins providing power to the ballast 104 (i.e., the input power source 102 is toggled from an off state to an on state). During the startup mode, the power stage 112 is not energized so the lamp driver 116 is not providing an output voltage. Thus, the lamp 106 is off and there is no output voltage on the another secondary winding of the lamp driver 116 for providing to the internal power supply 122. However, the input circuit 126 is electrically connected to the input power source 102 and provides power to the internal power supply 122. In particular, the resistor R1 draws current from the input power source 102 and the switch Q1, operating in the closed mode, conducts the current drawn by the resistor R1 from the input power source 102 to the internal power supply 122. The internal power supply 122 receives the current which produces a voltage across the capacitor.

In one embodiment, the input circuit 126 is configured to function as a linear regulator during the start up mode. In the illustrated embodiment, the switch Q1 has drain terminal, a gate terminal, and a source terminal. The input circuit 126 includes another resistor R2 (e.g., 1.8 mega ohm resistor R1) electrically connected to the drain terminal of the switch Q1, and together with the trickle resistor R1 operates as a voltage divider network. The input circuit 126 also includes a Zener diode D1 electrically connected to the switch Q1 between the drain terminal (via the another resistor R2) and gate terminal. The input circuit 126 is electrically connected to the internal power supply 122 via the source terminal. The Zener diode D1 along with the switch Q1 regulate the voltage generated across the voltage divider network so that a substantially constant voltage (e.g., about 24-25 volts) is generated by the internal power supply 122.

The voltage at the internal power supply 122 is provided to the power stage 112 (e.g., power factor control circuit 114 114, lamp driver 116) and the controller 120 (i.e., "startup"). Accordingly, the power factor control circuit 114 114, lamp driver 116, and controller 120 each receive voltage from the internal supply which is sufficient for energizing each of these components while the ballast 104 is started.

Once the power stage 112 is energized, the ballast 104 operates in the normal mode while the input power source 102 continues to provide power sufficient for energizing the lamp 106. In the normal mode, the power stage 112 converts the power supplied by the input power source 102 and accordingly energizes the lamp 106 with the converted power. The another second winding of the lamp driver 116 is energized provides power to the internal power supply 122. While the power provided to the internal power supply 122 by the lamp driver 116 is sufficient for operating the power stages and the controller 120, the power from the input power source 102 provided to the internal power supply 122 by the input circuit 126 is unnecessary. As such, while lamp driver 116 is providing sufficient power to the internal power supply 122, the controller 120 selectively operates the switch Q1 in the open mode to eliminate power loss which is associated with the operation of the input circuit 126.

In particular, the controller 120 includes an input electrically connecting the controller 120 to the internal power supply 122 an output electrically connecting the controller 120 to the switch Q1. The controller 120 monitors the voltage (or other related electrical parameter) of the internal power supply 122 via the input and controls the operation of the switch Q1 as a function of the monitored voltage via the output.

In one embodiment, the input switch Q1 is configured to function as a two point regulator during the normal mode. In particular, the controller 120 compares the monitored voltage to a threshold voltage. When the monitored voltage is greater than (greater than or equal to) the threshold voltage, the controller 120 operates the switch Q1 in the open mode. The controller 120 otherwise operates the switch Q1 in the closed mode. Thus, during normal mode, the voltage of the internal power supply 122 is continuously monitored by the controller 120 and when it is at least equal to the threshold voltage the switch Q1 is open and the input power source 102 is disconnected from the internal power supply 122. Conversely, when the voltage of the internal power supply 122 drops below the threshold voltage, the switch Q1 is closed and the input power source 102 is connected (e.g., re-connected) to the internal power supply 122 for providing additional power (e.g., during an interruption in the power provided by the lamp driver 116 to the internal power supply 122).

In the illustrated embodiment, the input circuit 126 includes an additional switch, such as a second switch Q2, connected between the gate terminal of the switch Q1 (i.e., the first switch) and the output of the controller 120. The second switch Q2 is off (e.g., operating in an open mode) during the startup mode and during the normal mode unless the controller 120 provides a control signal via the output of the controller 120 to the second switch Q2 causing it to turn on (e.g., operate in a closed mode, conducting). When the second switch Q2 conducts current, the voltage at the collector of the second switch Q2 drops to zero. The voltage across the gate and source terminals of the first switch Q1 becomes negative and causes the first switch Q1 to turn off (i.e., operate in the open mode).

The controller 120 is configured to provide the control signal causing the second switch Q2 to turn on and the first switch Q1 to turn off (i.e., operate in the open mode), while the monitored voltage (e.g. Vcc) is greater or equal to the threshold voltage. In one example, the upper threshold voltage is a predefined voltage value (e.g., 16 volts). In another example the lower threshold voltage is a predefined voltage value (e.g., 11 volts) indicating that the lamp driver 116 is providing sufficient power to the internal power supply 122. Both threshold voltages are lower than the voltage across the Zener diode D1 less the voltage across the gate and source terminals of the first switch Q1 to avoid the linear operation mode of Q1 in a non power saving mode.

In one embodiment, the controller 120 is further configured to determine whether the ballast 104 should be operated in a power save mode when the monitored voltage is less than the threshold voltage. While the power provided by the input circuit 126 to the internal power supply 122 is sufficient to start the ballast 104 and/or to operate it in normal operation momentarily (i.e., for short period of time), it is unable to sustain the ballast 104 during normal operation. Accordingly, the controller 120 is configured to initiate the power save mode when the monitored voltage is less than the threshold voltage for a pre-defined amount of time.

During the power save mode, the input power source 102 is providing a low level of power (e.g., 0.5-1 Watt) to the ballast 104. The input circuit 126 is operating in the closed state in order to provide power to the internal power supply 122 which is used to operate the components of the ballast 104 in the power save mode. In the power save mode, the controller 120 operates the lamp driver 116 (e.g., via the control signal) so that it does not provide power to the lamp 106 or to the internal power supply 122. Thus, the lamp 106 is not energized and the internal power supply 122 does not receive power from the power stages. The lamp driver 116 consumes a minimal amount of energy from the internal power supply 122 in order to minimize lamp re-ignition time when the input power source 102 resumes to a sufficient level for sustaining normal ballast operations.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A ballast for use with an input power source for energizing a lamp, said ballast comprising:
a power stage for converting power supplied by the input power source to drive the lamp;
a internal power supply connected to the power stage for receiving power from the power stage;
a input circuit connected to the internal power supply, said input circuit including a switch component, said switch component having a closed mode for electrically connecting the internal power supply to the input power source and conducting power from the input power source to the internal power supply, said switch component having an open mode for electrically disconnecting the internal power supply from the input power source;
a controller for controlling the operations of components of the ballast, said controller having a first input, a second input, and an output, said controller being electrically connected to the internal power supply for receiving power from the internal power supply via said first input to energize said controller, said controller being electrically connected to the internal power supply via said second input for monitoring the voltage of the internal power supply, said controller being electrically connected to the input circuit switch component via said output for selectively operating said switch component in the open mode and the closed mode as a function of the monitored voltage when the lamp is energized, wherein said switch component operates in the closed mode when the lamp is not energized.

2. The ballast of claim 1 wherein the input circuit includes a resistor electrically connected between the input power source and the switch component, wherein said resistor draws current from the input power source when said switch component operates in the closed mode and does not draw current from the input power source when said switch component operates in the open mode.

3. The ballast of claim 1 wherein the controller operates the switch component in the open mode when the lamp is energized and the monitored voltage is greater than a threshold voltage and the controller operates the switch component in the closed mode when the lamp is energized and the monitored voltage is less than the threshold voltage.

4. The ballast of claim 1 further comprising a Zener diode, wherein the switch component has a drain terminal, a source terminal, and a gate terminal, wherein said switch component is electrically connected to said Zener diode via the drain terminal and the gate terminal, wherein said switch component is electrically connected to the microcontroller power supply via the source terminal, wherein the input circuit is electrically connected to the microcontroller via the gate terminal and the microcontroller output.

5. The ballast of claim 4 wherein the switch component and the Zener diode regulate the power being provided from the input power source to the microcontroller power supply when said switch component is operates in the closed mode so that a substantially constant voltage is generated by the internal power supply.

6. The ballast of claim 4 wherein the controller operates the switch component in the open mode when the lamp is energized and the monitored voltage is greater than or equal to a threshold voltage, said threshold voltage is the voltage across the Zener diode less the voltage across the gate and source terminals of the switch component.

7. The ballast of claim 1 wherein the internal power supply is a capacitor.

8. The ballast of claim 1 wherein said internal power supply provides power to the power stage to energize said power stage when the switch component, operating in the closed mode, is conducting power from the input power source to said internal power supply, and wherein said control power supply receives power from the power stage when the power stage is energized and converting power supplied by the input power source to drive the lamp.

9. The ballast of claim 1 wherein said ballast is used with an alternating current (AC) input power source for energizing a high intensity discharge (HID) lamp.

10. A method for efficiently operating an electronic ballast for a high intensity discharge (HID) lamp while said electronic ballast is continuously receiving power from an input power source, said electronic ballast having a lamp driver and a microcontroller for controlling the lamp driver, said method comprising:

conducting power from the input power source to an internal power supply for energizing the microcontroller wherein said input power source is electrically connected to said internal power supply;

disconnecting the input power source from the internal power supply when the lamp driver is providing a voltage to the internal power supply that is greater a threshold voltage; and re-connecting the input power source to the internal power supply and conducting power from said input power source to said internal power supply when the lamp driver is providing a voltage to the internal power supply that is less than the threshold voltage.

11. The method of claim 10 wherein conducting power from the input power source to the internal power supply includes regulating the voltage of said power and providing a substantially constant voltage to the internal power supply.

12. A ballast for use with an input power source for energizing a lamp, said ballast comprising:

a lamp driver operating in one of a plurality of operating modes, said lamp driver operates in a start up mode when the lamp driver is energizing, said lamp driver operating in a normal mode when the lamp driver is energized and providing power from the input power source to energize the lamp, said lamp driver operating in a power save mode when the lamp driver is energized and is not providing power from the input power source to energize the lamp;

a resistor adapted for electrically connecting to the input power source for drawing power from the input power source;

an internal power supply electrically connected to the lamp driver for selectively receiving power from the lamp driver when the lamp driver is operating in the normal mode and electrically connected to the input power source via the resistor for selectively receiving power from the input power source via the resistor, said internal power supply for energizing a microcontroller for controlling the operations of components of the ballast; and a switch component connected between the resistor and the internal power supply, said switch component having a closed mode for electrically connecting the internal power supply to the input power source via the resistor and conducting power from the input power source to the internal power supply, said switch component having an open mode for electrically disconnecting the internal power supply from the input power source, wherein said switch component operates in the open mode when the lamp driver is operating in the normal mode and the voltage of the internal power supply is greater than a threshold voltage, and said switch component otherwise operates in the closed mode.

13. The ballast of claim 12 further comprising a microcontroller for receiving power from said microcontroller power supply.

14. The ballast of claim 12 further comprising a microcontroller, said microcontroller having a first input, a second input, and an output, said microcontroller being electrically connected to the internal power supply via said first input for receiving power from the internal power supply to energize said microcontroller, said microcontroller being electrically connected to the internal power supply via said second input for monitoring the voltage of the internal power supply, said microcontroller being electrically connected to the lamp driver via said output for operating the lamp driver in the power save mode when the monitored voltage is less than the threshold voltage for a pre-defined amount of time.

15. The ballast of claim 12 further comprising a microcontroller, said microcontroller having a first input, a second input, and an output, said microcontroller being electrically connected to the microcontroller power supply via said first input for receiving power from the internal power supply to energize said microcontroller, said microcontroller being electrically connected to the internal power supply via said second input for monitoring the voltage of the microcontroller power supply, said microcontroller being electrically connected to the switch component via said output for operating said switch component in the open mode when the lamp driver is operating in the normal mode and the voltage of the microcontroller power supply is greater than the threshold voltage, wherein said switch component otherwise operates in the closed mode.

16. The ballast of claim 15 further comprising a Zener diode, wherein the switch component has a drain terminal, a source terminal, and a gate terminal, wherein said switch component is electrically connected to said Zener diode via the drain terminal and the gate terminal, wherein said switch component is electrically connected to the microcontroller power supply via the source terminal, wherein the input circuit is electrically connected to the microcontroller via the gate terminal and the microcontroller output.

17. The ballast of claim 16 wherein the switch component and the Zener diode regulate the power being provided from the input power source to the microcontroller power supply when said switch component is operates in the closed mode so that a substantially constant voltage is generated by the internal power supply.

18. The ballast of claim 16 wherein the threshold voltage is the voltage across the Zener diode less the voltage across the gate and source terminals of the switch component.

19. The ballast of claim 12 wherein the microcontroller power supply is a capacitor.

20. The ballast of claim 12 wherein said ballast is used with an alternating current (AC) input power source for energizing a high intensity discharge (HID) lamp.

* * * * *